Oct. 6, 1959 W. S. BROFFITT 2,907,233
MECHANISM FOR INSPECTING AND ESTABLISHING
MACHINING LOCATION POINTS ON A WORKPIECE
Filed Oct. 29, 1956 6 Sheets-Sheet 1

INVENTOR.
Wilgus S. Broffitt
BY
L. D. Burch
ATTORNEY

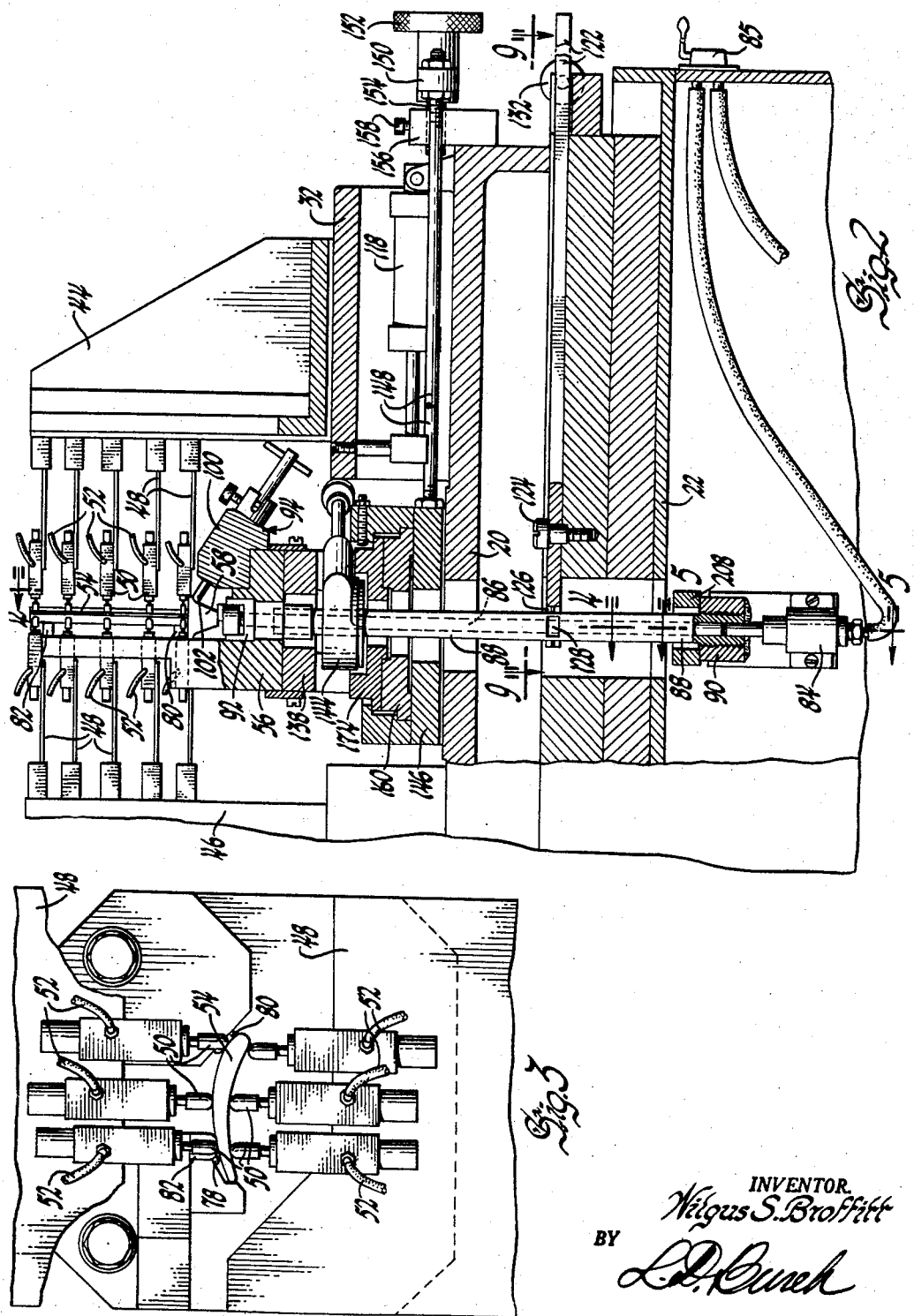

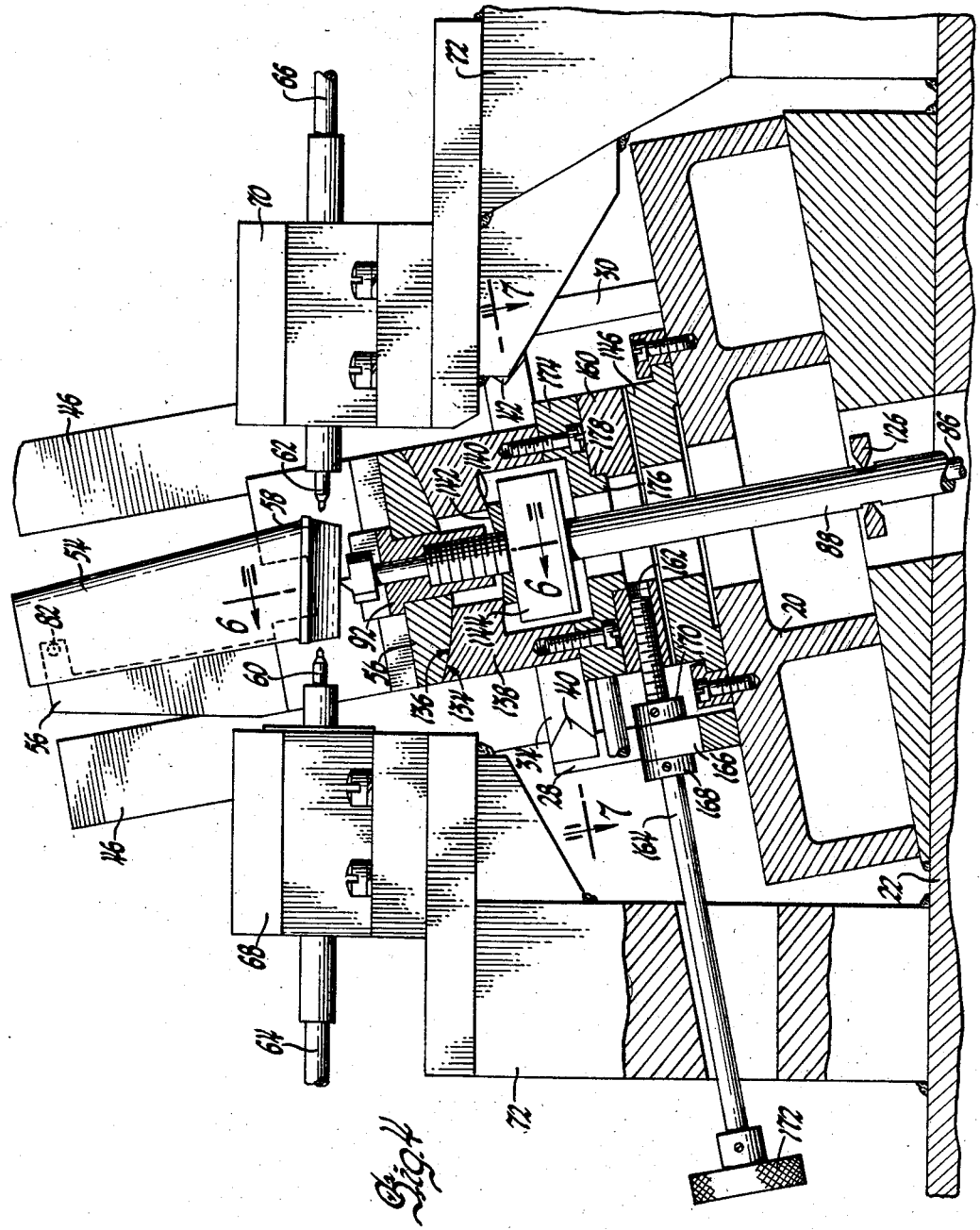

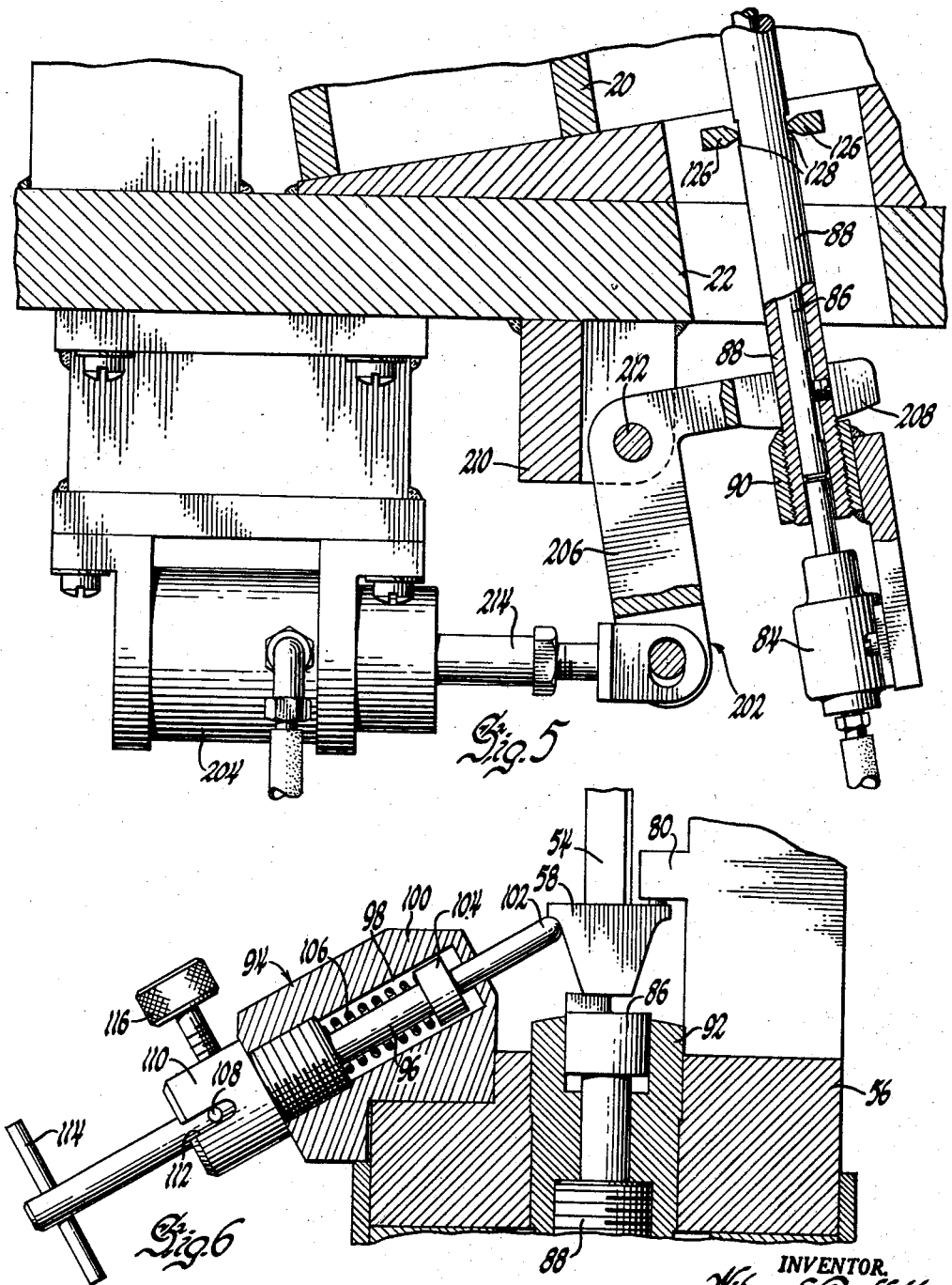

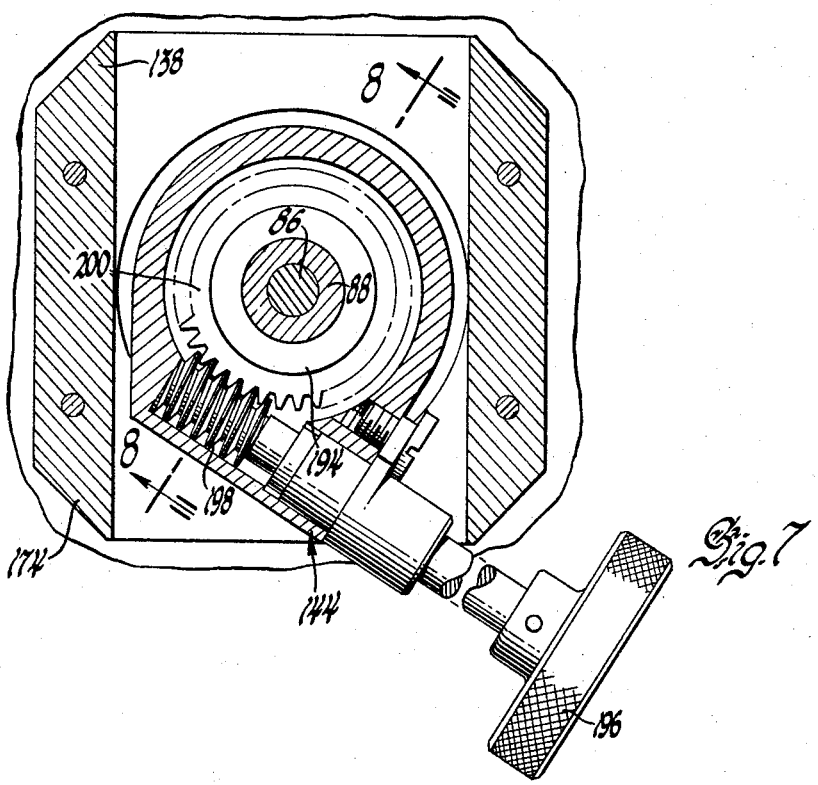
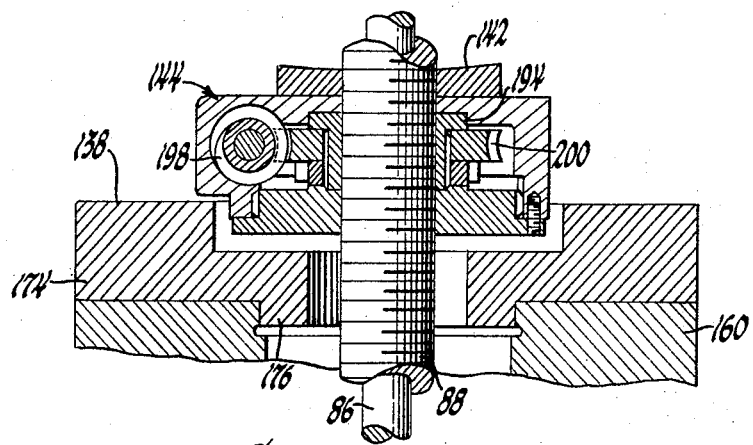

Oct. 6, 1959  W. S. BROFFITT  2,907,233
MECHANISM FOR INSPECTING AND ESTABLISHING
MACHINING LOCATION POINTS ON A WORKPIECE
Filed Oct. 29, 1956  6 Sheets-Sheet 6
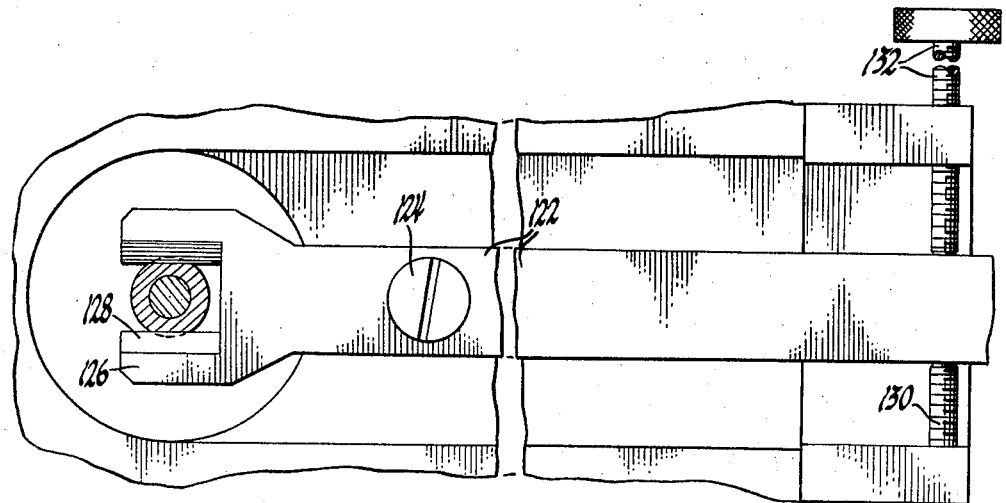
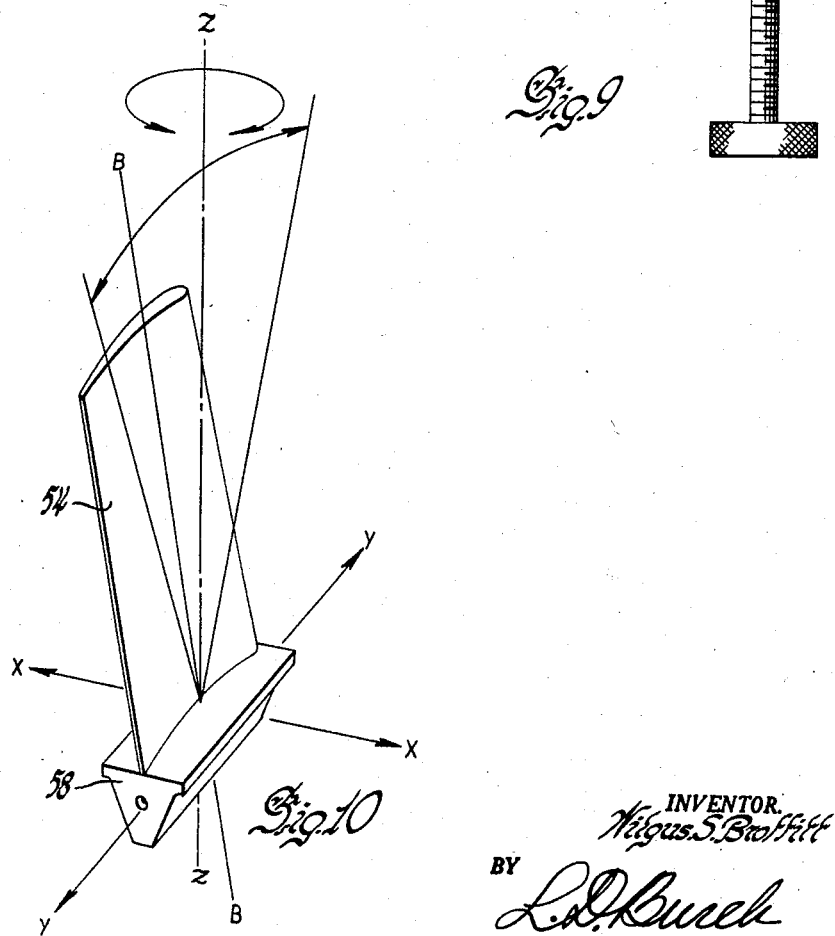
INVENTOR.
Wilgus S. Broffitt
BY
ATTORNEY ent Office

2,907,233
Patented Oct. 6, 1959

2,907,233

MECHANISM FOR INSPECTING AND ESTABLISHING MACHINING LOCATION POINTS ON A WORKPIECE

Wilgus S. Broffitt, Indianapolis, Ind., assignor to General Motors Corporation, Detroit, Mich., a corporation of Delaware Application October 29, 1956, Serial No. 619,008

7 Claims. (Cl. 77—5)

The invention relates to mechanism for establishing machining location points on a workpiece in direct relation to the desirable positioning of the workpiece.

The mechanism is especially useful in the manufacture of contoured multi-surface elements such as vanes, nozzles and turbine blades which may be used in gas turbine engines. In the manufacture of turbine blades, for example, it has long been a problem to so relate the dovetail mounting serrations to the blade airfoil that the blade airfoil portion, when assembled in a turbine wheel, will be positioned to obtain optimum performance.

A common procedure in the past has consisted of locating the blade on certain points known as "P" points, which are established on the blade by the blade manufacturer, and center drilling the root section to provide locating points for subsequent machining of the dovetail serrations. This procedure is not entirely satisfactory since it does not position the machining locations with respect to the best fitting contour of the airfoil, but is an indirect method for approximately positioning the machining locations. The machine disclosed permits the blade root portion to be center drilled whereby machining location points are established in direction relation to the best fitting contour of the airfoil. A particular machine embodying the invention may be a combination of plunger type air gages with an adjustable blade holding fixture and cooperating with center drilling devices. The machine inspects the airfoil and, while holding the blade in its best fitting contour position, permits the center drilling of the location points to be accomplished.

In the drawings:

Figure 2 shows a cross section view of a portion of the machine of Figure 1 with parts broken away and in section.

Figure 3 is a plan view showing the initial positioning of a blade in the machine of Figure 1.

Figure 4 is a view taken substantially in the direction of arrows 4—4 on Figure 2 and with parts broken away and in section.

Figure 5 is an enlarged cross section view taken substantially in the direction of arrows 5—5 of Figure 2 and shows a portion of the machine including the secondary locking mechanism.

Figure 6 is a view taken substantially in the direction of arrows 6—6 on Figure 4 and shows the initial blade positioning mechanism.

Figure 7 is a view taken substantially in the direction of arrows 7—7 on Figure 4 and shows the primary locking mechanism, with parts broken away and in section.

Figure 8 is a cross section view of the locking mechanism of Figure 7 taken in the direction of arrows 8—8 on Figure 7.

Figure 9 is a plan view of the tilt control with parts broken away and in section.

Figure 10 is a perspective view of a turbine blade showing the axes and planes about and in which the turbine blade may be adjusted.

Figure 1:
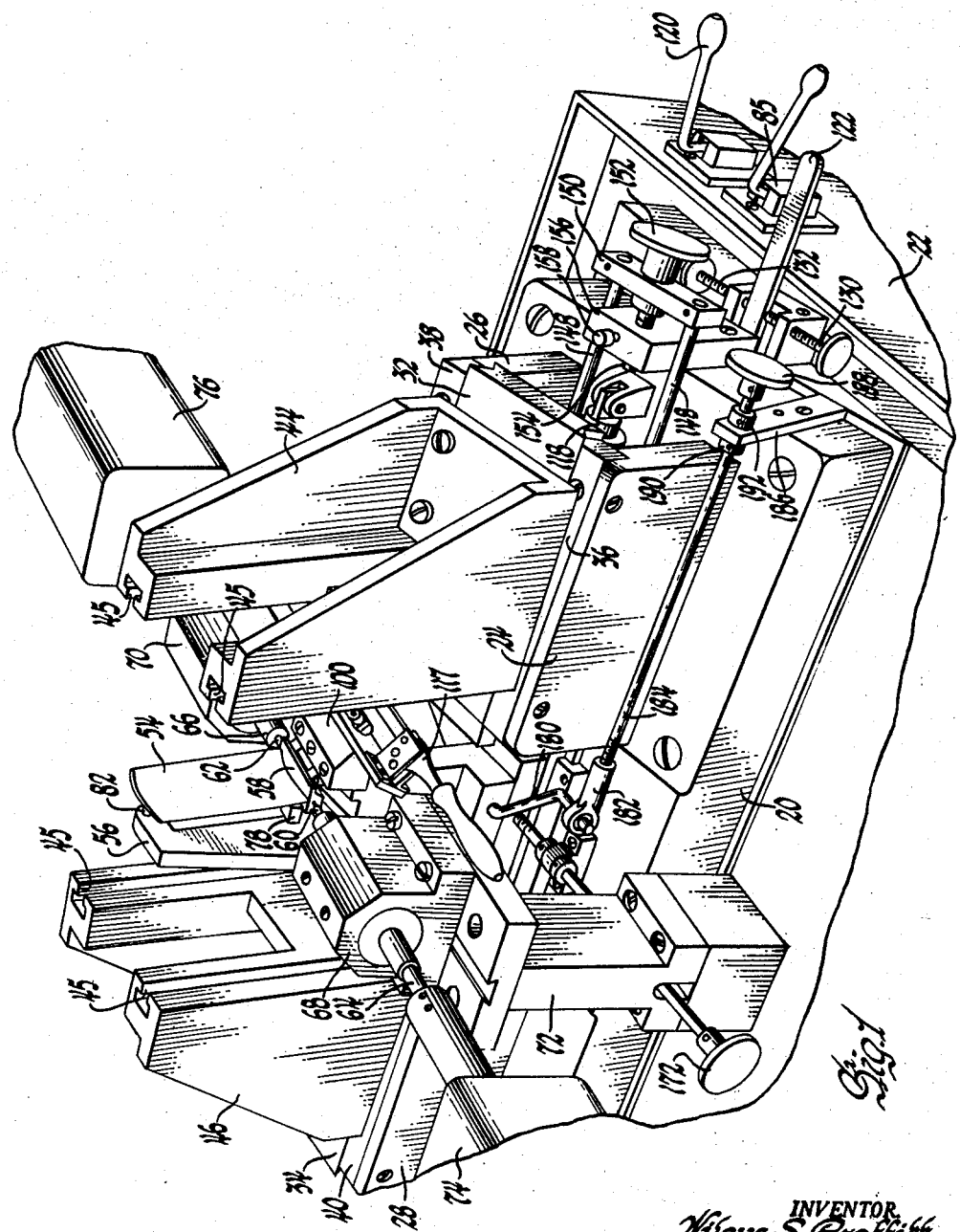
Figure 1 shows a perspective view of a machine embodying the invention with the plunge type air gages removed for clarity.

The checking and drilling machine has a base 20 which may be mounted on a base support 22. Either end of base 20 has secured thereto slide supporting ways 24, 26, 28 and 30. Slides 32 and 34 may be respectively received within slide guides 36, 38, 40 and 42 which are secured to the respective slide supporting ways. Platform brackets 44 and 46 are respectively secured to slides 32 and 34 by any convenient means. Platforms 48 are adjustably secured in slots 45 of brackets 44 and 46 and may be provided in any desirable numbers and arrangement to support the air gage plungers 50 which, when in the gaging position, are in engagement with the workpiece which is to be gaged and located with respect to the best fitting contour of the workpiece. Air supply hoses 52 may be provided to connect the plungers with a suitable air gage. A turbine blade 54 such as the blades used in aircraft turbines is shown in position on the machine and is supported by blade holder 56 and adjusting mechanisms. The adjusting mechanisms are supported on the base 20 and preferably located intermediate platform brackets 44 and 46, thereby supporting blade 54 at approximately the level of platforms 48 and plungers 50. On either side of blade holder 56 and in approximate alignment with the root portion 58 of blade 54 are located center drills 60 and 62. These drills are driven through drill shafts 64 and 66 which may be supported by bearing and guide supports 68 and 70. Pedestals 72 may be provided to position supports 68 and 70. Electric motors 74 and 76 may provide the power for the drills and the drill depth controls may be included in the mounts for the motors.

The adjusting mechanisms permit adjustment of the turbine blade holder, and consequently the turbine blade, in three mutually perpendicular planes, along two generally horizontal axes and rotatably about a generally vertical axis. Figure 10 shows the various attainable effects of the adjusting mechanisms on turbine blade 54. A first axis X—X, which is the fore and aft axis relative to the checking and drilling machine, is in a generally horizontal plane and may be substantially perpendicular to the blade root section 58. Axis Y—Y is the lateral axis along which lateral adjustment is obtained and may be parallel to root section 58. It is substantially at right angles to axis X—X and extends in a generally horizontal plane. Generally vertical axis Z—Z passes through axes X—X and Y—Y and may be substantially perpendicular to the latter two axes. It may be located on the blade axis B—B. If the blade axis B—B is not normal to either axis X—X or axis Y—Y as shown in Fig. 10, axis Z—Z may be located either normal to axes X—X and Y—Y or along axis B—B. The machine details as shown in Fig. 4 have axis Z—Z located along the blade axis and the blade may be rotated about that axis. The adjusting mechanisms provide for four basic adjustments. The blade may be independently moved parallel to axis X—X in the X—Y plane. It may also be independently moved parallel to axis Y—Y in the X—Y plane. The blade may be tilted about axis X—X in the Y—Z plane. It may also be rotated about the Z—Z axis.

Blade 54 is placed in position in blade holder 56 and held against blade positioning points 78, 80 and 82. Air cylinder 84 provides the force holding the blade against the blade positioning points. Air under pressure is piped to air cylinder 84 and is controlled by a valve 85 which may be positioned on the outside of base support 22 in any convenient position. When cylinder 84 is actuated, it pushes shaft 86 upwardly to engage the bottom of the blade root section 58 and the blade is located against the blade positioning points 78, 80 and 82. Air cylinder 84 is operatively secured to hollow shaft 88 by a mounting plate and bushing 90. Shaft 86 and shaft 88 may be concentrically arranged, with shaft 86 extending through hollow shaft 88. The upper end of shaft 88 is secured to blade holder 56 by nut or bushing member 92, which may be threaded on shaft 88 and seat on blade holder 56, as is shown in Figure 6.

The initial blade positioning mechanism 94, shown in detail in Figure 6, is used to locate the blade 54 against positioning points 78, 80 and 82 on the blade holder 56. The positioning mechanism includes a shaft 96 extending toward the blade holder through a bore 98 in housing 100 and having a blade contacting end 102. Intermediate the ends of shaft 96 and adjacent the bottom of the bore 98 is formed an enlarged section 104 against which one end of a spring 106 abuts. The end 102 of shaft 96 extends through a hole formed in the bottom end of bore 98 and is adapted to engage the root section 58 of blade 54. A through pin 108 is provided near the opposite end of shaft 96 and extends transversely through that shaft. Shaft guide 110 is threaded in the end of bore 98 adjacent pin 108 and is provided with a bore which receives a portion of shaft 96 intermediate pin 108 and enlarged section 104. The end of shaft guide 110 terminating in the bore provides an abutment for spring 106 which coacts with enlarged section 104 to spring load shaft 96 in the direction of blade 54. The external end of shaft guide 110 may have a pair of oppositely disposed slots 112 formed therein and adapted to receive pin 108. Shaft 96 may be reciprocated in the shaft guide and pin 108 will reciprocate in slots 112 which act as pin guides and permit the desired reciprocation of the shaft. Shaft 96 may be provided with a handle 114 by which the shaft may be rotated to align pin 108 with slots 112 or prevent such alignment at the discretion of the machine operator. When the pins are so aligned, end 102 is yieldingly held against the blade. Any convenient means of securing shaft 96 in a desired position may be provided, such as thumb screw 116. An initial blade positioning clamp 117 may be provided to hold the positioning mechanism in position.

After blade 54 is initially secured in position in blade holder 56 the air gage plungers may be engaged with the blade surfaces at predetermined positions. This is accomplished by movement of platform supports 44 and 46 along slide guide 36, 38, 40 and 42 toward blade 54 as it is secured on the holding and adjusting mechanisms. Slide air cylinders 118 may be conveniently used to move each of the platform brackets to their respective gaging positions. A valve control lever 120 may be located on the base support 22 in a position adjacent blade positioning air cylinder control lever and valve 85. Movement of lever 120 will control the air supply to the slide air cylinders 118. A precalibrated stop may be provided to allow the desired movement of platform brackets 44 and 46 to take place.

When platform brackets 44 and 46 are in their proper positions, gage plungers 50 are in engagement with blade 54 and readings may be obtained on a suitable air gage which is sensitive to the position of the gage plungers. These readings may include inspection of airfoil profile and dimensions. The blade may then be properly adjusted until it is located in its best fitting contour position relative to the center drills 60 and 62. The air gage plungers are so positioned relative to the axes of the center drills that when the blade is inspected for proper surface contours and proportions it is also in its best fitting contour position.

The blade adjusting mechanisms provide four basic adjustments which may be independently made. As shown in Figure 10, the blade may be tilted in the Y—Z plane about axis X—X. This movement is manually controlled by tilt lever 122. The tilt lever may be pivotally secured to base 20 by pivot bolt 124 and extend outwardly from the pivot bolt to a point to which it may be manually manipulated by the operator. The other end of lever 122 is provided with a yoke 126 which may be integrally formed with the lever. Hollow shaft 88 may have flat surfaces 128 formed thereon which may be engaged by yoke 126. The pivot bolt may be near the yoke end of lever 122 in order to gain accuracy of blade movement through the mechanical advantage realized. Tilt lever 122 may be pivoted horizontally about pivot bolt 124 and cause hollow shaft 88 to swing in the vertical Y—Z plane. The top portion of shaft 88 which is secured to blade holder 56 and nut or bushing member 92 imparts this swinging movement to the blade holder and therefore swings blade 54 proportionately to the pivoted movements of tilt lever 122. Tilt lever may be secured in position by thumb screws 130 and 132. The blade holder has a convex surface 134, as shown in Figure 4, which mates with a concave surface 136 on support member 138. Member 138 also has a convex surface 140 bearing on a concave surface 142 formed on the top of the primary locking mechanism 144. This arrangement permits tilting of the blade holder by movement of the shaft 88.

The blade holder may be displaced fore and aft along the X—X axis in the X—Y plane, as shown in Figure 10. This movement is accomplished by moving the fore and aft slide 146. The mechanism through which the fore and aft slide may be moved is best shown in Figures 1 and 2. A pair of shafts 148 are secured to fore and aft slide 146 at one end and at their opposite ends are secured to block 150. Knob 152 is attached to block 150 intermediate the points where shafts 148 are secured and is provided with a screw threaded section 154 on the opposite side of block 156. Section 154 is threadedly received in support block 156. When knob 152 is turned, threaded section 154 is screwed into or out of support block 156, thereby transmitting a calibrated movement to block 150 which in turn moves fore and aft slide 146 by means of shafts 148. Threaded section 154 may be secured in the desired position by any convenient means such as thumb screw 158. Since the blade holder is secured to and supported on fore and aft slide 146, it moves with that slide.

Lateral displacement along axis Y—Y is obtained by moving lateral slide 160 in a direction parallel to axis Y—Y. Slide 160 is slidably mounted on slide 146 for movement substantially at right angles to the movement afforded slide 146. Slide 160 has a threaded passage 162 formed therein in which adjusting shaft 164 is threadably received. Shaft 164 is rotatably mounted in a lug 166 which is secured to base 20 and is prevented from sliding axial movement relative to lug 166 by collars 168 and 170 which are secured to the shaft on either side of lug 166. The outer end of shaft 164 may be provided with a manual knob 172 by which shaft 164 may be rotated. Rotation of shaft 164 imparts linear movement to slide 160 by the screw thread action of the threads engaging the threaded passage 162.

Rotational movement of the blade about axis Z—Z is obtained by rotating turret member 174. The turret member has an annular depending extension 176 which is rotatably fitted in a counterbore 178 in lateral slide 160. Turret member 174 has a lever 180 secured to one side and extending radially outward. This lever acts as a pivot arm to control the rotational movement of the turret member. An extension link 182 is secured to the outer end of lever 180 and has a threaded bore substantially perpendicular to the lever. Control shaft 184 has one end threadedly engaged in the extension link bore and passes through an aperture in a mounting lug 186 which may be secured to base 20. The other end of shaft 184 may be provided with a knob 188 for manual control. Shaft 184 is so mounted in lug 186 as to have free rotational movement and is prevented from axial movement by a pair of collars 190 and 192 secured to shaft 184 on either side of lug 186. When knob 188 is rotated, shaft 184 is screwed into or out of link 182, transmitting linear movement to that link. This movement in turn pivots lever 180 about the axis of turret member 174 and rotates the turret member. In order to allow freedom of movement to tilt control shaft 88, slides 146 and 160 and turret member 174 are provided with central apertures of sufficient size to permit movement of that shaft.

After the blade is positioned and inspected for proper contours, etc., it is desirable to establish machining location points in either end of the root section of the blade while it is so positioned. These points may be drilled holes. In order to secure the blade and blade holder in position for center drilling these locating holes, two locking arrangements are provided. The worm and pinion locking mechanism 144 shown in Figures 7 and 8 clamps blade holder 56 and support member 138 between bushing 92 and nut 194. Nut 194 is threaded on hollow shaft 88 and may be run up or down that shaft by manipulation of knob 196 acting through worm 198 and gear 200. The secondary locking mechanism 202 is shown in Figure 5 and includes air cylinder 204 and actuating bell crank 206. Crank 206 is forked at 208 to receive shaft 88 and bear on the surface of threaded bushing 90, which is threaded on shaft 88 and to which air cylinder 84 is attached. Crank arm 206 may be pivotally attached to base 20 through mounting lug 210 and pivot pin 212. Air cylinder 204 may be controlled by any convenient valve and valve control mechanism. When air cylinder 204 is actuated, its piston rod 214 pivots lever 206 about pin 212, causing fork 208 to press against bushing 90 and place shaft 88 in tension, thus providing an additional locking force which tends to compress support member 138, turret member 174, lateral slide 160 and fore and aft slide 146 against the base 20, thereby holding them in their adjusted positions. The center drills 60 and 62 may then be energized and moved toward the blade until they drill the machining location holes in the root section of the blade.

Mechanism for directly locating machining location holes for a contoured surface such as a turbine blade in direct relation to the best fitting contour of the blade has thus been disclosed by which a blade can be inspected, aligned and drilled at one operating station. The machine shown and described illustrates a preferred embodiment which allows quick and accurate inspection and drilling operations to be performed.

What is claimed is:

1. In combination in a workpiece holding, adjustment and locking mechanism, first means for supporting said workpiece, second means for adjusting said workpiece to a desired position while supported by said first means, and a plurality of locking devices operatively connected with said first and second means for locking said workpiece in said desired position, said locking devices including a primary locking unit having a worm and gear actuating linkage and a secondary locking unit having a reciprocable motor acting through a pivoted link to lock said second means in position when said motor is actuated.

2. A position locating and locking mechanism for a workpiece, said mechanism comprising an air gage having a plurality of sensing plungers for gaging the profile of the workpiece, each of said plungers having a predeterminable reading resulting from a desired workpiece location, means receiving said workpiece immediately adjacent said plungers and adjustable in three planes and two rotatable dimensions to obtain said predeterminable plunger readings whereby the workpiece is located as desired, and locking means associated with said adjustable receiving means for locking said means with the workpiece in the desired location.

3. For use with a workpiece to be machined, in combination, a dimensional profile checking and positioning gage, a plurality of workpiece adjusting mechanisms for mounting and adjusting said workpiece in said gage, and means adjacent said gage and said mechanisms and positioned in predetermined alignment with said gage for establishing machining location points on said workpiece in direct relation to said workpiece profile.

4. In combination with an article mounting and adjustment means, a locking mechanism for locking said mounting and adjustment means in a desired position, said mounting and adjustment means including an article mount and a motor and a first shaft reciprocable by said motor to first and second positions for retaining said article in position in said mount when said first shaft is reciprocated to one of said positions and a second shaft concentric with said first shaft and having said motor mounted thereon for reciprocating first shaft relative to said second shaft, and linkage operatively connecting said shafts and linkage control means for imparting swinging movement to said shafts to adjust said article to a predetermined desired position, and means for operatively engaging said locking mechanism to said mounting and adjustment means to hold said article mounting and adjustment means in said desired position.

5. The combination in a mechanism for inspecting and establishing machining reference points on a workpiece, workpiece mounting, position adjusting and locking means and workpiece profile inspection means interconnected therewith in spaced relation for inspecting and determining the locating position of a workpiece in said first named means and means establishing machining reference points on a workpiece as determined by said inspection means, said first named means including a base and a workpiece mount supported thereon, first linkage means connected with said workpiece mount for tilting said mount about the first axis, second linkage means for moving said workpiece mount linearly in directions substantially parallel to said first axis, third linkage means for moving said workpiece mount linearly in directions parallel to a second axis substantially normal to said first axis, fourth linkage means for locating said workpiece mount about a third axis substantially normal to said first and second axes, said workpiece profile inspection means including bracket means slidably mounted on said base and a plurality of air gage plungers supported on said bracket means for engagement with a workpiece in said workpiece mount to inspect and determine the base feeding contour of a workpiece to which said position adjusting and locking means is adjusted and locked, said means for establishing reference points and establishing said points.

6. In combination in a mechanism for inspecting a workpiece and establishing machining reference points thereon, workpiece mounting position adjusting and locking means and means establishing machining reference points on a workpiece in said first named means and workpiece profile inspection means interconnected therewith in spaced relation for inspecting and determining the locating position of a workpiece in said first named means, said first named means comprising a base and a workpiece mount support thereon, first linkage means for imparting linear movement to said workpiece mount along a first line of movement and second linkage means for imparting linear movement to said workpiece mount along a second line of movement and third linkage means for imparting rotational movement to said workpiece mount about an axis substantially normal to said first and second lines of movement and fourth linkage means for rotating said workpiece mount through a planar arc about one of said lines of movement, said linkage means being cooperatively operable to position said workpiece to a position determined by said inspection means relative to said means establishing machining reference points, said workpiece profile inspection means comprising bracket means slidably mounted on said base and a plurality of air gage plungers supported on said bracket means for engagement with a workpiece held in said workpiece mount to inspect and determine the base feeding contour of the workpiece to which said position adjusting and locking means is adjusted and locked, said means for establishing reference points then establishing said points on the workpiece.

7. A machine for locating and establishing machining location points on a workpiece, said machine including a workpiece mounting and positioning device and a dimensional contour gage mounted in adjacent spaced relation to and operatively connected therewith and having elements in gage engageable relation to the workpiece for checking the dimensional contours thereof and means for forming said location points, said gage and said device being co-operatively operable by movement of said device with a workpiece mounted therein and said gage elements engaging the workpiece to gage and position said workpiece relative to said forming means so that the dimensional contours of the workpiece may be gaged and said location points may be established on the workpiece in direct relation to the dimensional contours of said workpiece.

References Cited in the file of this patent

UNITED STATES PATENTS

| | | |
|---|---|---|
| 81,407 | Richards | Aug. 25, 1868 |
| 2,017,865 | Morgan | Oct. 22, 1935 |
| 2,573,542 | Cherry | Oct. 30, 1951 |

FOREIGN PATENTS

| | | |
|---|---|---|
| 639,696 | Great Britain | July 5, 1950 |